United States Patent [19]
Leavitt et al.

[11] Patent Number: 5,835,913
[45] Date of Patent: Nov. 10, 1998

[54] SYSTEM AND METHOD FOR REPRODUCING FILES OF SOFTWARE INFORMATION

[75] Inventors: Thomas P. Leavitt; Robert Griego, both of Temple, Tex.

[73] Assignee: Texas Instruments Incorporated, Dallas, Tex.

[21] Appl. No.: 747,430

[22] Filed: Nov. 20, 1996

Related U.S. Application Data

[60] Provisional application No. 60/007,423 Nov. 21, 1995.
[51] Int. Cl.⁶ .................................................. G06F 17/30
[52] U.S. Cl. ......................... 707/204; 707/201; 707/202; 395/182.9
[58] Field of Search .................................. 707/201, 202, 707/204; 395/182.01

[56] References Cited

U.S. PATENT DOCUMENTS 5,666,530  9/1997  Clark et al. ........................... 707/201
5,742,829  4/1998  Davies et al. ......................... 395/712
5,745,669  4/1998  Hugard et al. ..................... 395/182.01
5,768,566  1/1998  Harikrishnan et al. ................. 395/500

*Primary Examiner*—Paul R. Lintz
*Attorney, Agent, or Firm*—Ronald O. Neerings; Richard L. Donaldson

[57] ABSTRACT

A system (10) is provided for reproducing files (24) of software information. The system (10) includes an initialization file (20) identifying the files (24) of software information. A copying program (22) is defined by the initialization file (20). The copying program (22) is operable to present the files (24) of software information identified by the initialization file (20) to a user of the system (10) when the copying program (22) is run. A processor (12) is operable to access the initialization file (20) and the copying program (22). The processor (12) is further operable to run the copying program (22) so that the user of the system (10) may select for copying at least one file (24) of software information presented by the copying program (22). A copying device (18), connected to the processor (12), is operable to copy any file (24) of software information selected by the user onto a software storage medium (26).

20 Claims, 3 Drawing Sheets

SYSTEM AND METHOD FOR REPRODUCING FILES OF SOFTWARE INFORMATION

This application claims priority under 35 USC § 119(e)(1) of provisional application number 60/007,423, filed Nov. 21, 1995.

TECHNICAL FIELD OF THE INVENTION

This invention relates generally to computer processing systems, and more particularly to a system and method for reproducing files of software information.

BACKGROUND OF THE INVENTION

The elements of a computer processing system can be generally differentiated into two categories: hardware elements or software elements. Hardware elements are the physical embodiments of the computer processing system, such as a monitor, a keyboard, a mouse, a printer, or a disk drive. Software elements are the instructional data, such as programs, which are run on the hardware elements. Although hardware elements may be relatively durable, software elements are not. For example, a program stored on a magnetic tape can accidentally be erased when the tape comes into contact with a magnet. Furthermore, a program stored in the memory of a computer processing system can be accidentally erased or changed when power to the system is lost or a power surge occurs. Consequently, it is desirable, and often necessary, to duplicate files of software information so that if one copy of the software information is destroyed, a backup copy still exists.

Previous systems and methods-for reproducing files of software information, however, were not user-friendly. In other words, a user of the computer processing system had to execute a complex series of commands in order to copy the files. These commands required that a user have intimate knowledge of the computer processing system. Furthermore, prior methods and systems provided no simple way for a user to keep track of which files of software information could be copied. Thus, even though a user might believe that all files of software information had been backed-up, some files would be lost when the user's computer processing system crashed.

Accordingly, a need has arisen for a method and system that facilitates the reproduction of files of software information.

SUMMARY OF THE INVENTION

In accordance with the teachings of the present invention, the disadvantages, and problems associated with previously developed methods and systems for reproducing files of software information have been substantially reduced or eliminated.

According to one embodiment of the present invention, a system is provided for reproducing files of software information. The system includes an initialization file identifying the files of software information. A copying program is defined by the initialization file. The copying program is operable to present the files of software information identified by the initialization file to a user of the system when the copying program is run. A processor is operable to access the initialization file and the copying program. The processor is further operable to run the copying program so that the user of the system may select for copying at least one file of software information presented by the copying program. A copying device, connected to the processor, is operable to copy any file of software information selected by the user onto a software storage medium.

According to another embodiment of the present invention, a system is provided for reproducing files of software information. The system includes an interface device operable to allow a user to interface with the system. An initialization file, stored on a memory, is operable to identify files of software information that can be reproduced. The initialization file is further operable to be updated by the user. A copying program, also stored on the memory, is defined by the initialization file. The copying program is operable to present on the interface device the files of software information identified by the initialization file to the user when the copying program is run. A processor is connected to the interface device and the memory. The processor is operable to run the copying program so that the user may select for copying a file of software information presented by the copying program. A copying device, connected to the processor, is operable to copy the file selected by the user onto a software storage medium.

According to yet another embodiment of the present invention, a method is provided for reproducing files of software information used by a computer processing system. The method includes a plurality of steps. Those steps are: generating an initialization file which identifies a plurality of files of software information that can be reproduced; accessing the initialization file to determine what files of software information can be reproduced; defining a copying program for reproducing the files of software information in response to accessing the initialization file; running the copying program so that the files of software information that can be reproduced are displayed to a user of the computer system; prompting the user to select at least one of the files of software information displayed; and reproducing the file of software information selected by the user onto a software storage medium.

An important technical advantage of the present invention is the use of an initialization file to display to a user all files of software information that can be reproduced.

A second important technical advantage of the present invention is that the system and method for reproducing files can incorporate, or be used in conjunction with, any of a number of existing copying software packages.

A third important technical advantage of the present invention is that the initialization file can be easily updated by a user.

A fourth important technical advantage of the present invention is the generation of labels for the software storage medium on which copies of the files are stored.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

The present invention provides a system and method that facilitates the reproduction of files of software information onto a software storage medium. The system and method uses an initialization file (".INI file") to create copies of software files contained in the memory of a computer processing system. Thus, the software files stored on a hard drive of the computer processing system can be readily reproduced by a user. In addition, the system and method can be set up to create copies of software files contained on external storage media, such as floppy disks.

Figure 1:
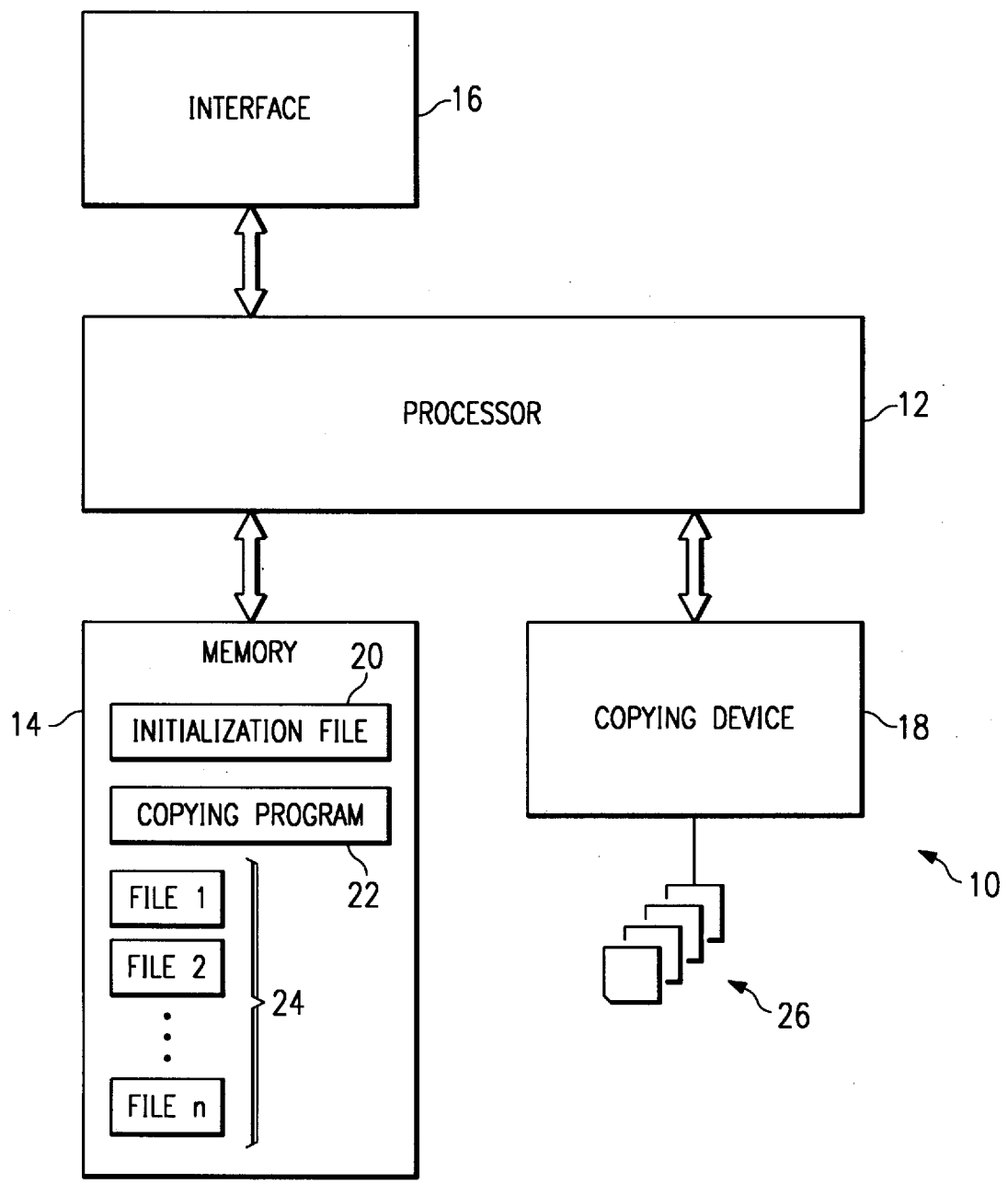
FIG. 1 illustrates system for reproducing files of software information according to a preferred embodiment of the present invention.

FIG. 1 illustrates a system 10 for reproducing files of software information. Preferably, system 10 is used in conjunction with a "WINDOWS," an operating system provided by Microsoft, Inc. System 10 includes a processor 12, a memory 14, an interface device 16, and a copying device 18. Processor 12 may be any computer processor such as a "PENTIUM," manufactured and sold by Intel, Inc.

Memory 14 is connected to processor 12. Memory 14 may be a memory internal to processor 12, such as a random access memory (RAM) or a read only memory (ROM). Alternatively, memory 14 may be external to the processor. For example, memory 14 may be a hard drive memory. Memory 14 is operable to store an initialization file 20, a copying program 22, and one or more files 24 of software information.

Initialization file 20 may be a text file that is alterable by a user of system 10. Consequently, initialization file 20 can be updated. Initialization file 20 is run automatically each time system 10 is powered up or rebooted. Initialization file 20 identifies all files 24 contained in memory 14.

Copying program 22 is also stored in memory 14. Copying program 22 is flexible so that it may be used with or incorporate any of a variety of copying software packages now marketed, such as Microsoft IMGet and IMput, and PKWARE PKZip and PKUnzip. Copying program 22 is defined by initialization file 20. More specifically, initialization file 20 dictates what software files 24 are displayed to a user, and thus available to be copied, when copying program 22 is run.

Files 24, stored in memory 14, may be the software application files that are input into memory 14 by the manufacturer of processor 12 and/or memory 14. Files 24 may also include application files added to memory 14 by a user. For example, files 24 may include such applications as MS-DOS, MS-WINDOWS FOR WORKGROUPS, MS Mouse, EZ SCSI, and PCMCIA. Furthermore, because initialization file 20 is alterable, files of software information not stored in memory 14 can be added to the files that are identified by the initialization file. For example, these files may be stored on an external storage media, such as floppy disks. Consequently, system 10 allows a user to make duplicate or backup copies of all files that are used by processor 12.

With further reference to FIG. 1, interface device 16 is connected to processor 12. Interface device 16 allows a user of system 10 to interact with processor 12. Interface device 16 includes any of a variety of devices such as a keyboard, a mouse, or a monitor, that allow a user to input information into and extract information from processor 12.

Copying device 18 is also connected to processor 12. Copying device 18 is operable to reproduce software files, such as files 24, onto a software storage medium 26, such as a floppy disk, a CD ROM, or a magnetic tape. Consequently, copying device 18 may be a disk drive, a CD ROM player, a tape player, or any other device operable to reproduce information onto software storage medium 26. Copying device 18 may also be operable to read information from software storage medium 26 into processor 12.

Figure 2:
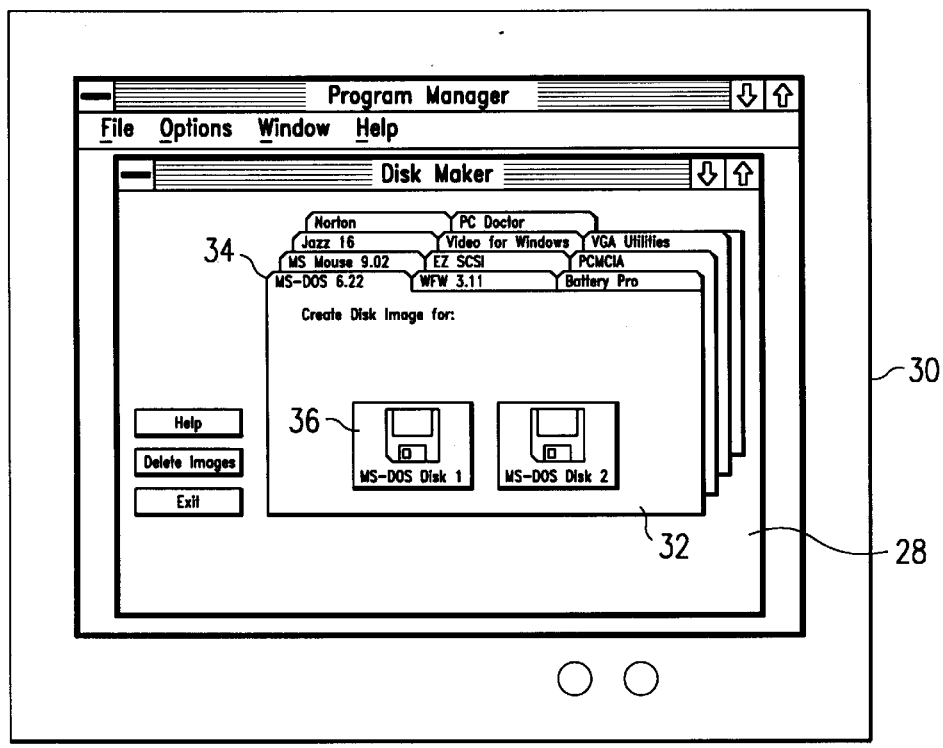
FIG. 2 illustrates a first screen displayed by the system of FIG. 1 according to the preferred embodiment of the present invention.

FIG. 2 illustrates a first screen 28 displayed by system 10 according to the preferred embodiment of the present invention. More specifically, when system 10 is initialized, processor 12 accesses initialization file 20 and copying program 22 from memory 14. Processor 12 uses the initialization file and copying program to generate first screen 28. First screen 28 is then displayed on a monitor 30, which may be part of interface device 16.

First screen 28 displays a plurality of file images 32, marked by tab images 34. File images 32.correspond to the files 24 of software information identified by initialization file 20. Each file image 32 represents a file of software information that can be copied or reproduced. Each tab image 34 may have the name of the corresponding file 24 as the name appears in the initialization file 20. Tab images 34 allow a user of system 10 to access each file 24, for example, by pointing to and clicking on the desired tab image 34.

Because initialization file 20 identifies all files 24, a user is able to verify which files may need to be duplicated by examining the tab images 34. In other words, if a user has made copies of some, but not all, files, the user can cross-reference the copied files with tab images 34. Any files 24 corresponding to tab images 34 that have not yet been copied, can be determined.

As shown in FIG. 2, files 24 may be the application files for processor 12, such as MS-DOS, MS-WINDOWS FOR WORKGROUPS, Battery Pro, MS Mouse, EZ SCSI, PCMCIA, and Jazz 16. Because these files can be relatively large, a single file 24 may not be capable of being copied onto a single unit of software storage medium 26. Consequently, system 10 divides each file 24 into a plurality of storage units which are capable of being stored on a single unit of software storage medium 26. The size of the storage unit depends upon the software storage medium utilized. For example, because a high-density floppy disk holds more information than a magnetic tape, a storage unit corresponding to a magnetic tape will be smaller than a storage unit corresponding to a high-density floppy disk. As illustrated in FIG. 2, each storage unit is represented by a disk icon 36. If a software storage medium 26 is used that is not a disk, however, system 10 may be configured so that first screen 28 displays icons that are representative of that particular software storage medium.

Figure 3:
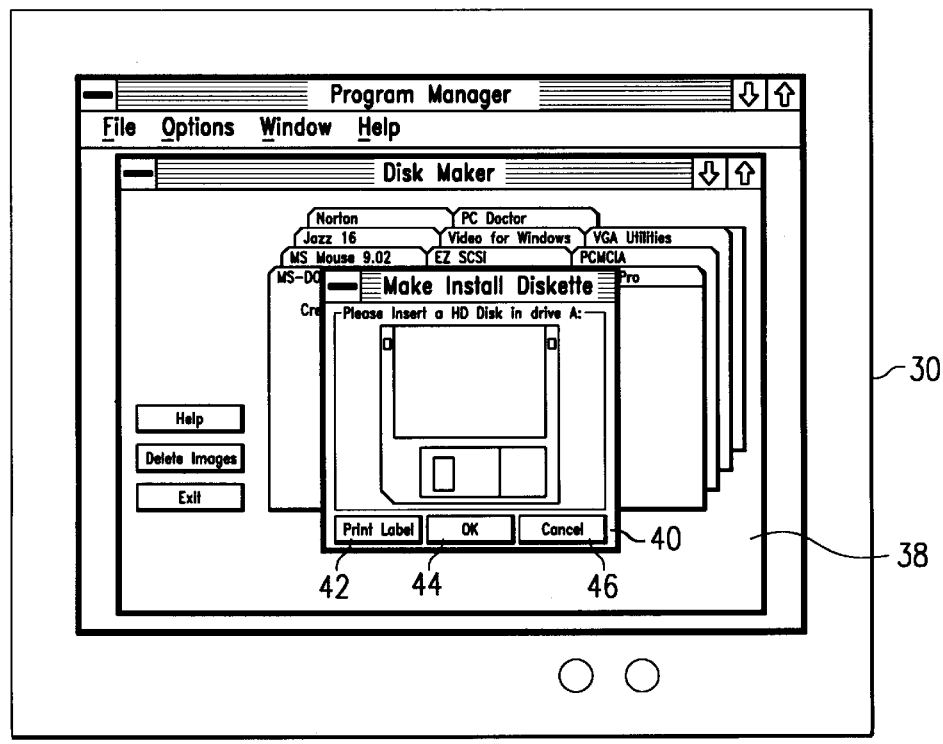
FIG. 3 illustrates a second screen displayed by the system of FIG. 1 according to the preferred embodiment of the invention.

FIG. 3 illustrates a second screen 38 displayed by system 10 of FIG. 1 according to the preferred embodiment of the present invention. Preferably, second screen 38 appears on monitor 30 when a user points to and clicks on a specific disk icon 36.

In second screen 38, a label maker icon 40 is displayed. Label maker icon 40 prompts a user to insert a unit of software storage medium 26 into copying device 18. Label maker icon 40 allows a user of system 10 to copy and generate labels for the files 24 represented by corresponding file images 36. Label maker icon 40 includes three options for the user. Those options are "Print Label" 42, "OK" 44, and "Cancel" 46.

If a user selects Print Label 42, system 10 will generate a label for a unit of software storage medium 26. It should be noted that a separate label will be made for each storage unit contained in a file 24 represented by a file image 36. For example, if a file image 36 contains three disk icons 36, a separate label can be made for each of the three storage units represented by the three disk icons.

If the user selects OK 44, system 10 will copy the storage unit represented by the selected disk icon 36 onto the unit of software storage medium 26 in copying device 18. A separate unit of software storage medium 26 is used for each storage unit.

If a user selects Cancel 46, label maker icon 40 disappears. More specifically, first screen 28 is again displayed on monitor 30.

Figure 4:
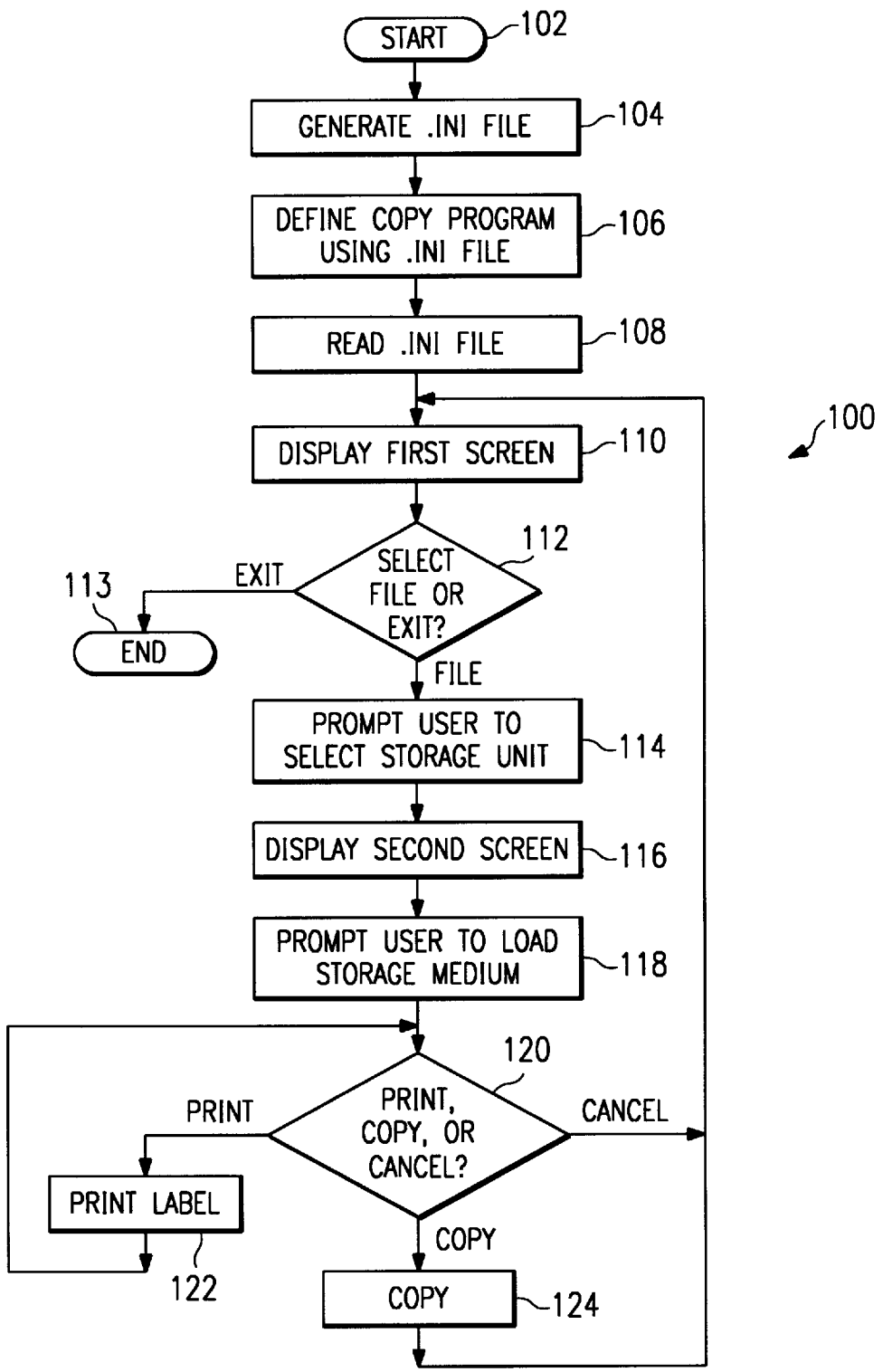
FIG. 4 is a flow diagram for a method for reproducing files of software information according to a preferred embodiment of the present invention.

FIG. 4 is a flow diagram for a method 100 for reproducing files of software information according to a preferred embodiment of the present invention. Method 100 corresponds to the operation of system 10. Accordingly, method 100 is best understood with reference to FIGS. 1–4.

At step 102, method 100 is started. Initialization file 20 is generated at step 104. Initialization file 20 identifies what files 24 of software information can be reproduced by system 10. System 10 may be set up so that initialization file 20 is automatically generated by processor 12.

At step 106, copying program 22 is defined using initialization file 20. In other words, the initialization file dictates the files 24 that are displayed to a user of system 10, and therefore available to be copied, when copying program 22 is run. Copying program 22 is flexible so that it may incorporate, or be used with, any of a variety of existing copying software packages such as IMGet, IMPut, PKZip, and PKUnzip.

At step 108, initialization file 20 is read. At step 110, method 100 uses initialization file 20 to display first screen 28 having a plurality of file images 32, marked by tab images 34. Each file image 32 represents a software file 24 that can be reproduced.

At step 112, method 100 queries the user to exit or select one of the files 24 represented by file images 32. If the user chooses to exit, method 100 ends at step 113. Otherwise, in order to make a select a file, the user points to and clicks on the corresponding tab image 34.

At step 114, method 100 prompts the user to select a storage unit contained within the file image 32 selected. Each storage unit, designated by a corresponding disk icon 36, is capable of being stored on a single unit of software storage medium 26.

At step 116, method 100 displays a second screen 38 for printing labels and copying the selected storage unit. Second screen 38 shows a label maker icon 40. Label maker icon 40 provides three options for the user: Print Label 42, OK 44, and Cancel 46.

At step 118, method 100 prompts a user of system 10 to load a unit of software storage medium 26 into copying device 18. Software storage medium 26 may be any medium onto which software files 24 may be copied, such as a floppy disk, a CD ROM, or a magnetic tape. Copying device 18 may be any device which can copy software files onto an appropriate software storage medium 26, such as a disk drive, a CD ROM player, a magnetic tape player.

At step 120, method 100 queries the user of system 10 about which option shown on second screen 38 the user desires. If the user desires to print a label for the unit of software storage medium 26, method 100 prints a label at step 122. Method 100 then returns to step 120 where the user is queried about which option the user desires.

If the user desires to copy the selected storage unit, method 100 uses copying device 18 to copy the storage unit onto the appropriate software storage medium at step 124. Method 100 then returns to step 110 where first screen 28 is displayed.

Otherwise, if the user desires to cancel, method 100 returns to step 110 where first screen 28 is displayed to the user.

Although the present invention and its advantages have been described in detail, it should be understood that various changes, substitutions, and alterations can be made herein without departing from the spirit and scope of the invention as defined by the appended claims.

What is claimed is:

1. A system for reproducing files of software information comprising:

an initialization file identifying the files of software information;

a copying program defined by the initialization file, the copying program operable to present the files of software information identified by the initialization file to a user of the system when the copying program is run;

a processor operable to access the initialization file and the copying program, the processor further operable to run the copying program so that the user of the system may select for copying at least one file of software information presented by the copying program; and a copying device connected to the processor and operable to copy any file of software information selected by the user onto a software storage medium.

2. The system of claim 1, wherein the initialization file comprises a text file.

3. The system of claim 1, wherein the initialization file is operable to be altered by the user.

4. The system of claim 1, wherein the copying program comprises a software package selected from the group comprising INGet, IMPut, PKzip, PKunzip, and any program used to reproduce files of software information.

5. The system of claim 1, further comprising a label-making device connected to the processor and operable to make labels for the software storage medium.

6. The system of claim 1, wherein the copying device is operable to copy the software information on a software storage medium selected from the group comprising floppy disks, software tapes, CD ROM, laser disks, and any other media onto which software information may be copied.

7. The system of claim 1, further comprising an interface device operable to allow the user to interface with the processor.

8. A system for reproducing files of software information comprising:

an interface device operable to allow a user to interface with the system;

an initialization file stored on a memory, the initialization file operable to identify files of software information that can be reproduced, the initialization file further operable to be updated by the user;

a copying program defined by the initialization file and stored on the memory, the copying program operable to present on the interface device the files of software information identified by the initialization file to the user when the copying program is run;

a processor connected to the interface device and the memory, the processor operable to run the copying program so that the user may select for copying a file of software information presented by the copying program; and a copying device connected to the processor and operable to copy the file selected by the user onto a software storage medium.

9. The system of claim 8, wherein the copying device is a device selected from the group comprising a floppy disk drive, a magnetic tape player, a CD ROM player, a laser disk player, and any other device operable to copy software information onto a storage medium.

10. The system of claim 8, wherein the copying device is operable to copy the software information on a software storage medium selected from the group consisting of floppy disks, software tape, CD ROM, laser disks, and any other media onto which software information may be copied.

11. The system of claim 8, wherein the initialization file can be updated by the user.

12. The system of claim 8, wherein the copying program is compatible with a plurality of copying software packages.

13. A method for reproducing files of software information used by a computer system comprising the steps of:

generating an initialization file which identifies a plurality of files of software information that can be reproduced;

accessing the initialization file to determine what files of software information can be reproduced;

defining a copying program in response to accessing the initialization file, said copying program for reproducing the files of software information;

running the copying program on a processor so that the files of software information that can be reproduced are displayed to a user of the computer system;

prompting the user to select at least one of the files of software information displayed; and reproducing the file of software information selected by the user onto a software storage medium.

14. The method of claim 13, wherein the step of displaying to a user comprises the steps of:

generating a file image for each file that can be reproduced; and displaying the file image to the user.

15. The method of claim 13, wherein the step of reproducing the file of software information comprises the step of copying the file on a software storage medium selected from the group comprising floppy disks, CD ROMS, software tapes, laser disks, and any other media onto which software information may be copied.

16. The method of claim 13, further comprising the steps of:

querying the user to determine if the user desires a label for the software storage medium;

receiving a signal from the user in response to the query; and generating a label for the software storage medium if the signal received from the user indicates that the user desires a label.

17. The method of claim 13, further comprising the step of updating the initialization file.

18. The method of claim 13, further comprising the step of prompting a user to input the storage medium onto which the selected file is to be reproduced.

19. The method of claim 13, further comprising the step of incorporating a copying software package into the copying program.

20. The method of claim 13, further comprising the step of dividing the files of software information into portions that can be stored on a single unit of software storage medium.

* * * * *